United States Patent [19]

Ohtsu et al.

[11] Patent Number: 5,179,170
[45] Date of Patent: Jan. 12, 1993

[54] DISPERSANT AND CEMENT ADMIXTURE

[75] Inventors: Kimiyo Ohtsu; Norihide Enomoto; Yoshihiro Naruse; Masato Takagi; Keiji Sugiura, all of Chiba, Japan

[73] Assignee: Kawasaki Steel Corporation, Hyogo, Japan

[21] Appl. No.: 381,632

[22] PCT Filed: Apr. 17, 1989

[86] PCT No.: PCT/JP89/00412
§ 371 Date: Jun. 30, 1989
§ 102(e) Date: Jun. 30, 1989

[87] PCT Pub. No.: WO90/12642
PCT Pub. Date: Nov. 1, 1990

[51] Int. Cl.$^5$ .................... C08F 267/04; C08K 3/00
[52] U.S. Cl. .................... 525/285; 524/5; 524/6; 524/69; 528/150; 525/161
[58] Field of Search ........... 524/69, 397, 286, 289, 524/5, 6; 528/150, 153; 525/285

[56] References Cited

U.S. PATENT DOCUMENTS 4,079,040  3/1978  Ribka et al. .................... 528/150
4,431,760  2/1984  Giddings et al. ................ 524/289

FOREIGN PATENT DOCUMENTS 0493532  1/1977  Australia.
34130    3/1978  Japan.
82307    5/1985  Japan.

Primary Examiner—Paul R. Michl
Assistant Examiner—Tae H. Yoon
Attorney, Agent, or Firm—Bierman and Muserlian

[57] ABSTRACT

The dispersant composed of a water-soluble salt of either a copolymer of a component in naphtha oil and maleic anhydride or a partial esterification product of said copolymer has improved dispersing ability and the dispersion containing this dispersant will experience only small changes with time.

The cement admixture which is a salt of a copolymer of a component in naphtha oil and an unsaturated dicarboxylic acid anhydride or which has further contains a salt of the product of condensation between formaldehyde and a sulfonated aromatic hydrocarbon containing oil is an effective plasticizer and the cement mix incorporating this admixture has a satisfactory initial flow and will experience only small decrease in flowability over time.

10 Claims, No Drawings

DISPERSANT AND CEMENT ADMIXTURE

TECHNICAL FIELD

The present invention relates to a novel dispersant, in particular, to a dispersant having improved dispersing ability and aging stability that is composed of a water-soluble salt either of a copolymer of a component in naphtha oil having a reactive double bond and maleic anhydride or a partial esterification product of said copolymer. The dispersant of the present invention may be applied to every field where inorganic or organic fine powders are used in dispersion systems and it finds utility in a broad range of applications including paints, inks, paper processing, pigment manufacture, civil engineering, mud stabilizers, ceramics, ferrites, fuels, etc.

The present invention also relates to an admixture for cements which harden by the action of water. More particularity, the present invention relates to a cement admixture that not only fluidizes cement mixes such as cement pastes, mortars and concretes but also ensures that their flowability will not decrease greatly with time.

BACKGROUND ART

Dispersants are commonly added in small amounts to ensure that inorganic or organic fine powders are uniformly dispersed in water or solvents so that the resulting dispersions have low viscosity and high flowability. Improved dispersibility will contribute not only to an improvement in the quality of the final product or its workability or handling property but also to an improvement in economy through the increase in the concentration of dispersions. Hence, dispersibility is a very important factor in various fields, to say nothing of the importance of the performance of the dispersants to be employed.

Sodium hexametaphosphate has been used for many years as a dispersant for pigments to be incorporated in coated paper. Sodium polyacrylate is known as an effective dispersant in a broad range of fields. Copolymers such as those of α-olefins and maleic anhydride and those of styrene and maleic anhydride have also been used as dispersants for pigments after they are converted to water-soluble salts.

However, none of the dispersants available today are completely satisfactory in terms of dispersing ability and aging stability.

In order for cement mixes (e.g. cement pastes, mortars and concretes) to have improved workability, they must exhibit high initial flowability and experience small change in flowability with time. The flowability of cement mixes is known to decrease with time due primarily to hydration reaction of cement with water and to physical aggregation of cement particles. Upon mixing the ingredients, hydration reaction of cement with water occurs in cement mixes and as time lapses, physical and chemical aggregation of cement particles proceeds to reduce cement flowability and its workability and constructibility will consequently decrease with time. This phenomenon is commonly referred to as "flow reduction" in mortars or "slump loss" in concretes and limits the "open time" of cement mixes. In the case of fresh concretes, slump loss causes various problems such as limited time of transportation, prolonged standby on the installation site and temporary interruptions of transfer by pumping, all these phenomena leading to undesirable effects such as deterioration of quality and low operational efficiency. Slump loss is also deleterious to fabricated concrete products since it limits molding time or causes insufficient centrifugal re-compaction. Therefore, slump loss, or time-dependent decrease in the flowability of cement mixes such as cement pastes, mortars and concretes, is a critical problem to be solved.

Several proposals have so far been made with a view to preventing slump loss in concretes. Japanese Patent Publication No. 51-15856 shows a method in which a concrete admixture selected either from water-soluble salts of sulfonated aromatic compounds or from water-soluble salts of the products of condensation between sulfonated aromatic compounds and formaldehyde is added repeatedly to concrete to maintain its flowability for a prolonged period. This method is effective to some extent but not only is it low in operational efficiency due to cumbersome procedures of addition of the admixture but it is also disadvantageous from an economic viewpoint.

Another method which involves the addition of a retarder such as an oxycarboxylic acid causes reduction in strength and insufficient hardening. Hydration of cement can be retarded by this method but it is very difficult to prevent physical aggregation of cement particles.

Japanese Patent Public Disclosure No. 54-139929 shows a method in which granules of a concrete admixture such as the product of condensation between naphthalenesulfonic acid and formaldehyde are added to concrete and dissolve slowly to prevent slump loss in the concrete. This method is effective to some extent in preventing slump loss but on the other hand, it is difficult to control the rate of dissolution of the admixture and residual admixture granules will reduce the strength and durability of the concrete.

Japanese Patent Publication No. 63-10107 (Japanese Patent Public Disclosure No. 60-11256) shows additives composed of a saponified styrene-maleic acid copolymer that can be added to cements to prevent slump loss. These additives, however, are not very effective in improving the flowability of cement mixes. Besides, they entrain an undesirably large amount of air and suffer from an economic disadvantage in that they have to be prepared from expensive materials.

Thus, none of the methods so far proposed to prevent slump loss are far from being satisfactory for practical purposes.

DISCLOSURE OF THE INVENTION

The present inventors conducted intensive studies with a view to developing dispersants that will exhibit high dispersing performance in a broad range of fields and have finally reached the present invention.

An object of the present invention is to provide such improved dispersants at low cost through effective use of naphtha oil.

Another object of the present invention is to provide a novel cement admixture which, when incorporated in a cement mix, will impart high initial flow while ensuring that the cement mix will not experience substantial loss in flowability over time.

In accordance with the present invention, there is provided a dispersant composed of a water-soluble salt of either a copolymer of an indene-based component having a reactive double bond and maleic anhydride or a partial esterification product of said copolymer.

As said water-soluble salt, an alkali metal salt or an ammonium salt is preferable.

The present invention also provides a cement admixture that may be incorporated in cement mixes to increase their flowability while preventing it from decreasing with time and which is composed of an alkali metal salt, ammonium salt or amine salt of a copolymer prepared by reaction between an indene-based component having a reactive double bond and an unsaturated dicarboxylic acid anhydride having an olefinic double bond.

The present invention further provides a cement admixture that contains at least one component selected from among alkali metal salts, ammonium salts and amine salts of a copolymer prepared by reaction between an indene-based component having a reactive double bound and an unsaturated dicarboxylic acid anhydride having an olefinic double bond and at least one additional component selected from among alkali metal salts, alkaline earth metal salts, ammonium salts and amine salts of a compound prepared by first sulfonating a naphthalene and/or alkylnaphthalene based aromatic hydrocarbon containing oil, then condensing the sulfonated product with formaldehyde.

CONSTITUTION OF THE INVENTION

The present invention is described below in greater detail.

A. Dispersant

The dispersant of the present invention is prepared from two starting materials, one of which is an indene-based component having a reactive double bond that is contained in naphtha oil.

Naphtha oil is a neutral oil produced from coal or petroleum that has a boiling point in the range of from 80° to 220° C. The principal components of naphtha oil include those which have no reactive double bond such as benzene, toluene, xylenes, trimethylbenzenes, ethyltoluenes, indan, tetramethylbenzenes, methylindans, propylbenzenes and naphthalenes, as well as those which have a reactive double bond (these components are hereinafter referred to as "polymerizable components") as specifically exemplified by styrene, α-methylstyrenes, methylstyrenes, dimethylstyrenes, trimethylstyrenes, indene, methylindenes, dicyclopentadiene, coumarone, etc. Naphtha oil also contains minor amounts of acidic substances, basic (nitrogenous) substances and sulfur-containing substances, the contents of these substances varying greatly depending upon the method of preliminary treatment to be applied to naphtha oil.

The term "polymerizable components" as used hereinabove refers to the mixtures that are chiefly composed of indene and aromatic hydrocarbons having a reactive double bond and which are present in naphtha oil.

The composition of naphtha oil may vary with the method of distillation and the type of starting materials used and the sum of the polymerizable components, i.e., indene and aromatic hydrocarbons having a reactive double bond is about 5–80 wt% on average. The contents of polymerizable components can be increased up to 100% by further distillation.

The higher the contents of polymerizable components present in starting naphtha oil, the easier the manufacture of the copolymer to be used in the present invention. From a reaction viewpoint, it suffices for the purpose of the present invention that the polymerizable components are present in an amount of at least 5 wt% in naphtha oil. Additional advantages are that there is no need for the step of isolating the polymerizable components and that the nonpolymerizable components may be used as reaction solvents in the manufacture of the copolymer.

Indene is a substance of the highest content of the polymerizable components and as to coal tar naphtha oil, at least 70 wt% of the polymerizable components is occupied by indene.

The copolymer for use in the present invention is obtained from the naphtha oil described above.

The polymerizable components of naphtha oil are chiefly composed of aromatic hydrocarbons having a reactive double bond. As shown below, the polymerizable components in naphtha oil which are chiefly composed of indene and which are present in an amount of at least 5 wt% consist of the following components (a), (b) and (c) whose contents are indicated by weight percentages:

(a) 70–99 wt% of indene;
(b) 0.5–29.5 wt% of styrene; and
(c) 0.5–29.5 wt% in total of one or more compounds selected from among α-methylstyrene, methylstyrene, methylindene, dimethylstyrene, trimethylstyrene, coumarone and dicyclopentadiene.

The sum of (a), (b) and (c) is substantially (a)+(b)+(c)=100 wt%.

The copolymer to be used in the present invention is a copolymer of maleic anhydride and the polymerizable components in naphtha oil which, as described above, are chiefly composed of aromatic hydrocarbons having a reactive double bond.

This copolymer may be produced by subjecting the polymerizable components in naphtha oil and maleic anhydride to radical polymerization reaction. The composition of the copolymer will vary depending upon the constitution of the aromatic hydrocarbons in naphtha oil which have a reactive double bond.

The molar ratio of the sum of the indene-based polymerizable components in naphtha oil to maleic anhydride is not limited to any particular value but is preferably in the range of 2/1–1/2.

The resulting copolymer of the polymerizable components in naphtha oil and maleic anhydride is a white powder having a number average molecular weight (Mn) of 1,200–35,000. As in the case of the copolymer of styrene and maleic anhydride, this copolymer, either per se or in the form of an ester or amide of the acid anhydride group or in the form of the product of hydrolysis with an alkali hydroxide or ammonia, may be used extensively as a plasticizer, a dispersant for dyes or pigments, an adhesive, a paper size, etc.

Styrene to be used as a starting material is expensive since it is manufactured by dehydrogenation reaction of ethylbenzene on an industrial scale. Considering this fact, the copolymer of the polymerizable components in naphtha oil and maleic anhydride is an industrially attractive product since there is no need for the step of isolating the starting materials.

B. Process for Producing the Dispersant

The copolymer for use in the present invention may be prepared by any known method, for example, by radical polymerization of naphtha oil with maleic anhydride.

In preparing the copolymer by radical reaction of the polymerizable components in naphtha oil with maleic anhydride, alternating copolymerization reaction may be utilized in the temperature range of 0°–180° C. with a radical reaction initiator added or with the aid of hot radicals generated at the reaction temperature.

However, if naphtha oil containing polymerizable components in an amount of at least 5 wt% and maleic anhydride are totally charged into the polymerizer before the radical reaction is started by addition of a radical reaction initiator or with the aid of hot radicals generated at the reaction temperature, an industrially suitable method is not attained since the heat of reaction presents considerable difficulty in controlling the temperature in the polymerizer. It is therefore preferred to add either one or both of naphtha oil and maleic anhydride into the polymerizer at such rate that the reaction temperature can be controlled at a suitable level.

It is essential that radicals be generated by a suitable method in radical polymerization reaction. This may be done by adding a radical reaction initiator or by inducing hot radicals through elevation of the reaction temperature. However, the latter method is not preferred in the case of preparing the copolymer of the polymerizable components in naphtha oil with maleic anhydride because a high temperature of at least 130° C. is necessary to generate hot radicals and because the hot radicals generated may cause coloration of the resulting copolymer. It is thus recommended that a radical reaction initiator be employed to generate radicals.

The radical reaction initiator to be used may be either an azo-based radical reaction initiator or a peroxide based radical initiator. It is recommended to select such radical reaction initiators that the radicals generated will work effectively in the temperature range of 50°–130° C., or stated more specifically, that the half life thereof at the reaction temperature ranges from 0.1 to 10 h. Preferably, azobisisobutyronitrile, benzoyl peroxide, dicumyl peroxide, Perbutyl I (product of Nippon Oil & Fats Co., Ltd.), Perbutyl Z (product of Nippon Oil & Fats Co., Ltd.), etc. are used.

Charging the entire portion of the radical reaction initiator into the polymerizer at a time is not appropriate since its decomposition is simultaneously started. Thus, the radical reaction initiator is preferable charged gradually into the polymerizer. Some radical reaction initiators are solid and may preferably be charged after being dissolved in the naphtha oil or a solution of maleic anhydride to be added into the polymerizer.

The radical reaction initiator may be used in an amount ranging from 0.05 to 5 mol% of the total number of moles of the polymerizable components in naphtha oil and maleic anhydride.

The solvent that may be used in the reaction under consideration must satisfy the condition that it not react chemically with maleic anhydride, have the ability to dissolve maleic anhydride, be miscible with naptha oil, and not deteriorate the copolymer produced. Suitable solvents that satisfy these conditions include: aromatic hydrocarbons such as benzene, toluene, xylenes, trimethylbenzenes, tetramethylbenzenes, indan, methylindan (these being solvent components other than the polymerizable components in naphtha oil), ethylbenzene and propylbenzene; and components other than those present in naphtha oil such as ketones (e.g. acetone, methyl ethyl ketone, methyl propyl ketone, methyl isobutyl ketone, and cyclohexanone). halogenated alkyls (e.g. 1,2-dichloroethane), and ethers (e.g. ethyl ether, dioxane, anisole and tetrahydrofuran).

One of the major advantages that result from employing a reaction system that consists of a homogeneous solution is that since the copolymer of polymerizable components in naphtha oil and maleic anhydride is in the form of either a solution or fine particles in cream, it can be readily recovered from the polymerizer after completion of the reaction, with the added advantage of convenience in cleaning the polymerizer.

The method of preparing the copolymer for use in the present invention is outlined below. A glass polymerizer, or a polymerizer in which the part that is to contact the reaction solution is coated with glass, or a stainless steel polymerizer, which are equipped with a stirrer, an external heater and condenser, is charged with maleic anhydride dissolved in a solvent, which is held at the reflux temperature so that dissolved oxygen in the solution is removed by degasing, purging with nitrogen or some other method.

Regardless of the mode of reaction to be adopted, removal of dissolved oxygen from the reaction system is the necessary step for preparing the copolymer of polymerizable components in naphtha oil and maleic anhydride.

After dissolved oxygen is removed, naphtha oil is gradually charged into the polymerizer through an overhead inlet by a suitable method such as pumping or dropping. The naphtha oil to be added may be diluted with one or more of the inert solvents already described.

The radical reaction initiator may be added together with the naphtha oil charge (in this case, the initiator is dissolved preliminarily in the naphtha oil) or alternatively, the initiator may be added gradually through an inlet that is separate from the inlet for the naphtha oil. If the radical reaction initiator is in the solid state, it must be dissolved in one or more of the solvents already described.

There are various modes of reaction that can be adopted in the present invention. In one method, naphtha oil either independently or as a dilution thereof with a suitable solvent is preliminarily charged into the polymerizer, and thereafter, a solution of maleic anhydride is charged into the polymerizer, either together with or separately from the radical reaction initiator by a suitable method such as pumping or dropping. According to another method, only a solvent is charged into the polymerizer before the reaction is started, and after heating to the reflux temperature, three additional feeds, naphtha oil, maleic anhydride and the radical reaction initiator, are charged into the polymerizer either altogether or in appropriate combinations by a suitable method such as pumping or dropping. It should be noted here that maleic anhydride being solid, must be charged into the polymerizer after it is dissolved in an appropriate amount of one or more of the solvents described above.

Even in the case where maleic anhydride is to be charged together with naphtha oil in which it is dissolved, a suitable amount of solvent may advantageously be used as a diluent since naphtha oil alone is insufficient to make a complete solution of maleic anhydride.

Polymerization reaction is performed by either one of the methods described above to make the copolymer of polymerizable components in naphtha oil with maleic anhydride.

In order to achieve proper control of the reaction, the rate of addition of the respective components must be such that they are charged over a period of 0.5–5 h.

After completion of their addition, the respective components must be held at the same temperature as that maintained during their addition and generally speaking, the period 0.5-2 times as long as the duration of addition is sufficient to bring the reaction to substantial completion.

The yield of the copolymer of polymerizable components in naphtha oil and maleic anhydride may be calculated by the following equation (1):

$$\text{Copolymer yield (\%)} = \frac{\text{weight (g) of the copolymer of polymerizable components in naphtha oil and maleic anhydride}}{\text{polymerizable components (g) in naphtha oil + maleic anhydride (g)}} \times 100 \quad (1)$$

The copolymer obtained was analyzed by infrared (IR) absorption spectroscopy, nuclear magnetic resonance (NMR) spectroscopy and gel permeation chromatography (GPC).

It should be noted here that the processes for producing the copolymer for use in the present invention are in no way limited to the methods described above.

Product of partial esterification of the copolymer, salt of the copolymer, and salt of the partial esterification product of the copolymer:

The copolymer produced may be provided with a moderate hydrophobicity by esterifying the acid anhydride group using a suitable alcohol. The degree of hydrophobicity can be freely adjusted by changing the type of alcohol used in the reaction or the degree of esterification and hence the dispersant of the present invention is adaptive to a broad range of inorganic and organic powders.

The esterification product of the copolymer between polymerizable components in naphtha oil and maleic anhydride may be prepared by allowing an alcohol to act on said copolymer. And alcohol can be used without any problem as long as it allows the reaction of esterification to proceed. Specific examples of alcohols that can be used include: aliphatic alcohols such as methyl alcohol, ethyl alcohol, propyl alcohol, butyl alcohol, amyl alcohol and hexyl alcohol; cellosolves such as methyl cellosolve, ethyl cellosolve, propyl cellosolve, and butyl cellosolve; lower diols such as ethylene glycol, diethylene glycol and 1,4-butane-diol; and alcohols having a functional group such as monochloroalcohol, allyl alcohol, ethanolamine and benzyl alcohol.

When the copolymer between polymerizable components in naphtha oil and maleic anhydride is reacted with an alcohol, esterification will proceed with the site of the acid anhydride group in said copolymer undergoing ring opening due to the alcohol, so the degree of esterification will not exceed 50% under ordinary conditions. Thus, in order to attain a degree of esterification that exceeds 50%, it becomes necessary to add an appropriate catalyst such as an acid catalyst.

However, if the dispersant of the present invention is to be used in aqueous systems, some or all of the carboxyl groups that remain to be esterified must be hydrolyzed with alkali hydroxides or ammonia to make water-soluble salts, so that the degree of esterification in this case is preferably not more than 50%.

The appropriate degree of esterification will vary with the type of substance to be dispersed (i.e., inorganic or organic fine powder), its particle size, specific surface area or the state of the surface of particles, but it is typically within the range of 3-50%.

The salt of the copolymer or the salt of its partial esterification product, which make up the dispersant of the present invention, is preferably selected from among the salts of alkali metals such as sodium and potassium, and ammonium salts. Part of these salts may be replaced by alkaline earth metal salts or may be left unneutralized.

The dispersant of the present invention which is made of the salt of either the copolymer or the product of its esterification has not only the ability to reduce the viscosity of the dispersion markedly but also a capability for keeping the dispersion highly stable over a prolonged period of time. Hence, this dispersant may be effectively used with inorganic fine powders such as calcium carbonate, satin white, clay, carbon black, titanium oxide, zinc oxide, iron oxide, manganese oxide, barium sulfate, aluminum hydroxide, magnesium hydroxide, bentonite, alumina, zeolite, silicon nitride, cement, etc., or with organic fine powders such as azo pigments, phthalocyanine pigments, threne dyes, anthraquinone disperse dyes, coal powder, etc.

The amount in which the dispersant of the present invention is to be added will vary with such factors as the type of fine powder to be dispersed and the particle size thereof, but it may be used in an amount ranging from 0.05 to 5%, preferably from 0.1 to 3%, of the fine powder. C. Cement Admixture The cement admixture of the present invention is a salt of the copolymer between an indene-based component having a reactive double bond and an unsaturated dicarboxylic acid anhydride having an olefinic double bond.

For the indene-based component having a reactive double bond, discussion has already been made under A. Dispersant.

Examples of the unsaturated dicarboxylic acid anhydride having an olefinic double bond include maleic anhydride and itaconic anhydride, with maleic anhydride being preferred.

The molar ratio of the sum of indene-based components having a reactive double bond to the unsaturated dicarboxylic acid anhydride is not limited to any particular value but is preferably in the range of 2:1 to 1:2.

The copolymer to be used as a cement admixture preferably has a number average molecular weight of at least 2,000 as measured by GPC analysis. If the number average molecular weight of the copolymer is less than 2,000, an undesirably large amount of air will be entrained in cement mixes. GPC analysis for molecular weight measurement is performed under the following conditions:

Column:Tsk-gel G5000HxL+Tsk-gel G4000HxL +Tsk-gel G3000HxL+Tsk-gel G1000HxL (each column is produced by Tosoh Corp. and has a height of 30 cm)

Mobile phase : tetrahydrofuran

Cclum temperature: 40° C.

Flow rate : 1.0 ml/min

Detector : differential refractometer

Standard material: polystyrene with mol. wt. of 266-260,000 (product of Tosoh Corp.)

The copolymer is not used as such but is used in the form of a salt in order to exhibit its dispersing effect as quickly as possible and to be rendered water-soluble. Stated more specifically, the copolymer is used as an alkali metal (e.g. Na or K) salt, an ammonium salt or an amine salt. A sodium salt is particularly preferred. The acid anhydride is preferably totally neutralized in these salts but it may partly remain unneutralized.

The copolymer described above may be prepared by any method. A preferred method is as follows: an indene-containing coal tar naphtha fraction is reacted with maleic anhydride under conditions of radical polymerization in the presence or absence of a radical reaction initiator to make a copolymer, which is neutralized with sodium hydroxide to obtain a sodium salt of the copolymer. For further details, see under B. Process for Producing the Dispersant.

Another embodiment of the present invention is a cement admixture which is the same as the embodiment described above except that it contains at least one additional component selected from among alkali metal salts, alkaline earth metal salts, ammonium salts and amine salts of a compound prepared by first sulfonating a naphthalene and/or alkylnaphthalene based aromatic hydrocarbon containing oil, then condensing the sulfonated product with formaldehyde.

Examples of the naphthalene and/or alkylnaphthalene based aromatic hydrocarbon containing oil are naphthalene, methylnaphthalene and other aromatic hydrocarbons which may be used either on their own or as admixtures. For economic reasons, however, naphthalene oil fractions and methylnaphthalene oil fractions that are obtained in the step of coal tar distillation are preferred. These oils obtained by coal tar distillation may be used as such or after being subjected to various preliminary treatments.

These aromatic hydrocarbon containing oils are sulfonated by a conventional method, then condensed with formaldehyde. The resulting compounds are used in the form of alkali metal salts, alkaline earth metal salts, ammonium salts or amine salts.

The salt of the copolymer that is obtained by reaction between an indene-based component having a reactive double bond and an unsaturated dicarboxylic acid anhydride is preferably mixed with the above-described second compound (i.e., the salt of a compound which is obtained by first sulfonating an aromatic hydrocarbon containing oil and then condensing the sulfonated product with formaldehyde) in such proportions that at least 10 parts by weight of the copolymer salt is used in combination with 90 parts by weight of the second component. If the amount of the copolymer salt is less than 10 parts by weight, the resulting cement admixture will not be sufficiently effective in reducing the time-dependent change in the flowability of a cement mix.

The so prepared cement admixture of the present invention is mixed with the necessary ingredients described below to form a cement composition, a mortar composition or a concrete composition. The resulting compositions will entrain such a small amount of air that the air content can be varied over a wide range by proper adjustments on the working site. In addition, the cement mixes such as cement pastes, mortars and concretes have a high degree of initial flowability, which will not decrease greatly with time.

Cement composition (1) Water
(2) Cement
(3) Admixture of the present invention

Mortar composition (1) Fine aggregate
(2) Water
(3) Cement
(4) Admixture of the present invention Concrete composition (1) Fine aggregate
(2) Coarse aggregate
(3) Water
(4) Cement
(5) Admixture of the present invention The cement admixture of the present invention may be added in various ways; for instance, it may be added to water to be incorporated in cement mixes such as cement pastes, mortars and concretes; alternatively, it may be added to freshly prepared cement mixes. The cement admixture of the present invention is preferably used in an amount of 0.01-1.0 wt% of cement, with the range of 0.1-0.5 wt% being particularly preferred. The admixture may be used in combination with various additives such as air entraining (AE) agents, AE water reducing agents, hardening regulators, etc.

EXAMPLES

The following examples are provided for the purpose of further illustrating the present invention but are in no way to be taken as limiting.

EXAMPLE 1

A beaker was charged with 200 g of an aqueous solution having dissolved therein a predetermined amount (see Table 1) of a Na salt of the copolymer (mol. wt. 4400) of polymerizable components in naphtha oil and maleic anhydride. After adding 300 g of a fine particulate calcium carbonate ("Nichienka pz" of Shiraishi Kogyo Co., Ltd.), the mixture was stirred with a mixer (Homomixer of Tokushu Kika Kogyo Co., Ltd.) at 1500 rpm for 15 min.

The apparent viscosities of the resulting 60% slurries were measured with a Brookfield viscometer both immediately after their preparation and after 24 h. The conditions of measurements were 25° C. $\times$ 60 rpm. The results are shown in Table 1.

The molecular weight of the copolymer is shown in terms of the number average molecular weight as determined by gel permeation chromatography.

EXAMPLE 2

Slurries were prepared as in Example 1 except that the copolymer (mol. wt. 4400) of polymerizable components in naphtha oil and maleic anhydride was replaced by a copolymer having a molecular weight of 9200. The apparent viscosities of the slurries were measured and the results are shown in Table 1.

With a view to evaluating the heat resistance of the dispersant prepared in Example 2, they were charged into an autoclave and heated with stirring at 250° C. for 5 h. After cooling, part of the slurries was subjected to evaluation of the dispersibility of calcium carbonate as above. The result was substantially the same as before the slurries were charged into the autoclave.

EXAMPLE 3

Slurries were prepared as in Example 1 except that the copolymer (mol. wt. 4400) of polymerizable components in naphtha oil and maleic anhydride was replaced by a copolymer having a molecular weight of 24,000. The apparent viscosities of the slurries were measured and the results and shown in Table 1.

COMPARATIVE EXAMPLE 1 copolymer. The apparent viscosities of the slurries were measured and the results are shown in Table 1.

TABLE 1

| | Dispersant | Amount of dispersant (% pure content vs calcium carbonate) | Viscosity (cps) initial | 24 h |
|---|---|---|---|---|
| Example 1 | Na salt of copolymer (mol. wt. 4400) of polymerizable components in naphtha oil and maleic anhydride | 1.0<br>2.0 | 570<br>324 | 572<br>324 |
| Example 2 | Na salt of copolymer (mol. wt. 9200) of polymerizable components in naphtha oil and maleic anhydride | 1.0<br>2.0 | 243<br>222 | 245<br>222 |
| Example 3 | Na salt of copolymer (mol. wt. 24000) of polymerizable components in naphtha oil and maleic anhydride | 1.0<br>2.0 | 185<br>328 | 186<br>334 |
| Comparative Example 1 | commercial Na salt of polyacrylic acid | 1.0<br>2.0 | 500<br>696 | 511<br>702 |
| Comparative Example 2 | commercial Na salt of styrene/maleic anhydride copolymer | 1.0<br>2.0 | 1300<br>1150 | 1350<br>1200 |
| Comparative Example 3 | commercial Na salt of α-olefin/maleic anhydride copolymer | 1.0<br>2.0 | 1076<br>436 | 1082<br>449 |

Slurries were prepared as in Example 1 except that the Na salt of the copolymer of polymerizable components in naphtha oil and maleic anhydride was replaced by a commercial Na salt of polyacrylic acid. The apparent viscosities of the slurries were measured and the results and shown in Table 1.

COMPARATIVE EXAMPLE 2

Slurries were prepared as in Example 1 except that the Na salt of the copolymer of polymerizable components in naphtha oil and maleic anhydride was replaced by a commercial Na salt of styrene-maleic anhydride copolymer. The apparent viscosities of the slurries were measured and the results and shown in Table 1.

COMPARATIVE EXAMPLE 3

Slurries were prepared as in Example 1 except that the Na salt of the copolymer of polymerizable components in naphtha oil and maleic anhydride was replaced by a commercial Na salt of α-olefin-maleic anhydride copolymer.

EXAMPLES 4-6

A beaker was charged with 125 g of an aqueous solution having dissolved therein a predetermined amount (see Table 2) of a Na salt of one of the copolymers (mol. wt. 4400, 9200 and 24,000) used in Example 1-3. After adding 375 g of ground calcium carbonate (Whiton P-30 of Shiraishi Kogyo Co., Ltd.), slurries were prepared as in Example 1. The apparent viscosities of the resulting 75% slurries were measured both immediately after their preparation and after 24 h. The results are shown in Table 2.

COMPARATIVE EXAMPLES 4-6

Slurries were prepared as in Examples 4-6 except that the Na salts of copolymers were replaced respectively by the commercial Na salts of polyacrylic acid, styrene-maleic anhydride copolymer and α-olefin-maleic anhydride which were used in Comparative Examples 1-3. The apparent viscosities of the slurries were measured, and the results are shown in Table 2.

TABLE 2

| | Dispersant | Amount of dispersant (% pure content vs calcium carbonate) | Viscosity (cps) initial | 24 h |
|---|---|---|---|---|
| Example 4 | Na salt of copolymer (mol. wt. 4400) of polymerizable components in naphtha oil and maleic anhydride | 0.2<br>0.3 | 66<br>80 | 66<br>80 |
| Example 5 | Na salt of copolymer (mol. wt. 9200) of polymerizable components in naphtha oil and maleic anhydride | 0.2<br>0.3 | 72.5<br>82 | 73<br>82 |
| Example 6 | Na salt of copolymer (mol. wt. 24000) of polymerizable components in naphtha oil and maleic anhydride | 0.2<br>0.3 | 69.5<br>90 | 70<br>90 |
| Comparative Example 4 | commercial Na salt of polyacrylic acid | 0.2<br>0.3 | 90.5<br>102 | 92<br>105 |
| Comparative Example 5 | commercial Na salt of styrene/maleic anhydride | 0.2<br>0.3 | 93<br>110 | 95<br>119 |

TABLE 2-continued

| | Dispersant | Amount of dispersant (% pure content vs calcium carbonate) | Viscosity (cps) initial | 24 h |
|---|---|---|---|---|
| Comparative Example 6 | commercial Na salt of copolymer α-olefin/maleic anhydride copolymer | 0.2<br>0.3 | 4500<br>208 | 4570<br>218 |

EXAMPLES 7-9

A beaker was charged with 400 g of an aqueous solution having dissolved therein a predetermined amount (see Table 3) of a Na salt of one of the copolymers (mol. wt. 4400, 9200 and 24,000) of polymerizable components in naphtha oil and maleic anhydride which were used in Examples 1-3. After adding 100 g of carbon black (Color Black MA 100 of Mitsubishi Kasei Corp.), slurries were prepared as in Example 1. The apparent viscosities of the resulting 20% slurries were measured and the results are shown in Table 3.

EXAMPLE 10

Slurries were prepared as in Examples 7-9 except that the Na salts of copolymers of polymerizable components in naphtha oil and maleic anhydride which were used as dispersants were replaced by a Na salt of a copolymer (mol. wt. 4400) of polymerizable components in naphtha oil and maleic anhydride that had been esterified with isopropyl alcohol for an esterification degree of 35%. The apparent viscosities of the resulting 20% slurries of carbon black were measured and the results are shown in Table 3.

EXAMPLE 11

Slurries were prepared as in Examples 7-9 except that the Na salts of copolymers of polymerizable components in naphtha oil and maleic anhydride which were used as dispersants were replaced by a Na salt of a copolymer (mol. wt. 9200) of polymerizable components in naphtha oil and maleic anhydride that had been esterified with normal butyl cellosolve for an esterification degree of 40%. The apparent viscosities of the resulting 20% slurries of carbon black were measured and the results are shown in Table 3.

COMPARATIVE EXAMPLE 7

Slurries were prepared as in Examples 7-9 except that the Na salts of copolymers of polymerizable components in naphtha oil and maleic anhydride which were used as dispersants were replaced by a commercial Na salt of polyacrylic acid. The apparent viscosities of the resulting 20% slurries of carbon black were measured and the results and shown in Table 3.

COMPARATIVE EXAMPLE 8

Slurries were prepared as in Examples 7-9 except that the Na salts of copolymers of polymerizable components in naphtha oil and maleic anhydride which were used as dispersant were replaced by a commercial Na salt of styrene-maleic anhydride copolymer. The apparent viscosities of the resulting 20% slurries of carbon black were measured and the results are shown in Table 3.

COMPARATIVE EXAMPLE 9

Slurries were prepared as in Examples 7-9 except that the Na salts of copolymers of polymerizable components in naphtha oil and maleic anhydride which were used as dispersants were replaced by a commercial Na salt of α-olefin-maleic anhydride copolymer. The apparent viscosities of the resulting 20% slurries of carbon black were measured and the results and shown in Table 3.

COMPARATIVE EXAMPLE 10

Slurries were prepared as in Examples 7-9 except that the Na salts of copolymers of polymerizable components in naphtha oil and maleic anhydride which were used as dispersants were replaced by a commercial Na salt of modified isobutylene-maleic anhydride copolymer. The apparent viscosities of the resulting 20% slurries of carbon black were measured and the results are shown in Table 3.

TABLE 3

| | Dispersant | Amount of dispersant (% pure content vs carbon black) | Viscosity (cps) |
|---|---|---|---|
| Example 7 | Na salt of copolymer (mol. wt. 4400) of polymerizable components in naphtha oil and maleic anhydride | 2.0<br>3.0 | 5.6<br>6.2 |
| Example 8 | Na salt of copolymer (mol. wt. 9200) of polymerizable components in naphtha oil and maleic anhydride | 2.0<br>3.0 | 8.7<br>9.2 |
| Example 9 | Na salt of copolymer (mol. wt. 24000) of polymerizable components in naphtha oil and maleic anhydride | 2.0<br>3.0 | 8.8<br>9.4 |
| Example 10 | Na salt of partial esterification product of copolymer (mol. wt. | 2.0<br>3.0 | 4.6<br>4.4 |

TABLE 3-continued

| | Dispersant | Amount of dispersant (% pure content vs carbon black) | Viscosity (cps) |
|---|---|---|---|
| | 4400) of polymerizable components in naphtha oil and maleic anhydride | | |
| Example 11 | Na salt of partial esterification product of copolymer (mol. wt. 9200) of polymerizable components in naphtha oil and maleic anhydride | 2.0<br>3.0 | 7.2<br>7.0 |
| Comparative Example 7 | commercial Na salt of polyacrylic acid | 2.0<br>3.0 | 344<br>284 |
| Comparative Example 8 | commercial Na salt of styrene/maleic anhydride copolymer | 2.0<br>3.0 | 10.2<br>9.8 |
| Comparative Example 9 | commercial Na salt of α-olefin/maleic anhydride copolymer | 2.0<br>3.0 | 544<br>904 |
| Comparative Example 10 | commercial Na salt of modified isobutylene/maleic anhydride copolymer | 2.0<br>3.0 | 40<br>105 |

EXAMPLES 12 AND 13

A beaker was charged with 150 g of an aqueous solution having dissolved therein a predetermined amount (see Table 4) of an NH$_4$ salt of one of the copolymers (mol. wt. 4400 and 9200) of polymerizable components in naphtha oil and maleic anhydride. After adding 350 g of alumina (ultrafine particulate low soda alumina "AL-160 SG" of Showa Keikinzoku Co., Ltd.), slurries were prepared as in Example 1. The apparent viscosities of the resulting 70% slurries were measured and the results are shown in Table 4.

COMPARATIVE EXAMPLE 11

Slurries were prepared as in Examples 12 and 13 except that the NH$_4$ salts of copolymers of polymerizable components in naphtha oil and maleic anhydride which were used as dispersants were replaced by a commercial NH$_4$ salt of polyacrylic acid. The apparent viscosities of the resulting 70% slurries of alumina were measured and the results are shown in Table 4.

COMPARATIVE EXAMPLE 12

Slurries were prepared as in Examples 12 and 13 except that the NH$_4$ salts of copolymers of polymerizable components in naphtha oil and maleic anhydride which were used as dispersants were replaced by a commercial NH$_4$ salt of modified isobutylene-maleic anhydride copolymer. The apparent viscosities of the resulting 70% slurries of alumina were measured and the results are shown in Table 4.

TABLE 4

| | Dispersant | Amount of dispersant (% pure content vs alumina) | Viscosity (cps) |
|---|---|---|---|
| Example 12 | NH$_4$ salt of copolymer (mol. wt. 4400) of polymerizable components in naphtha oil and maleic anhydride | 0.3<br>0.5 | 32<br>48 |
| Example 13 | NH$_4$ salt of copolymer (mol. wt. 9200) of polymerizable components in naphtha oil and maleic anhydride | 0.5<br>0.7 | 47<br>45 |
| Comparative Example 11 | commercial NH$_4$ salt of polyacrylic acid | 0.3<br>0.5 | 90<br>200 |
| Comparative Example 12 | commercial NH$_4$ salt of modified isobutylene/maleic anhydride copolymer | 0.3<br>0.5 | 55<br>63 |

EXAMPLES 14 AND 15

A beaker was charged with 195 g of an aqueous solution having dissolved therein a predetermined amount (see Table 5) of an NH$_4$ salt of one of the copolymers (mol. wt. 4400 and 9200) of polymerizable components in naphtha oil and maleic anhydride. After adding 455 g of zirconia (partially stabilized zirconia "TZ-3Y" of Tosoh Corp.), slurries were prepared as in Example 1. The apparent viscosities of the resulting 70% slurries were measured and the results are shown in Table 5.

COMPARATIVE EXAMPLE 13

Slurries were prepared as in Examples 14 and 15 except that the NH$_4$ salts of copolymers of polymerizable components in naphtha oil and maleic anhydride which were used as dispersants were replaced by a commercial NH$_4$ salt of polyacrylic acid. The apparent viscosities of the resulting 70% slurries of zirconia were measured and the results are shown in Table 5.

TABLE 5

| | Dispersant | Amount of dispersant (% pure content vs zirconia) | Viscosity (cps) |
|---|---|---|---|
| Example 14 | NH$_4$ salt of copolymer (mol. wt. 4400) of polymerizable components in naphtha oil and maleic anhydride | 1.2<br>1.5 | 234<br>471 |
| Example 15 | NH$_4$ salt of copolymer (mol. wt. 9200) of polymerizable components in naphtha oil and maleic anhydride | 1.2<br>1.5 | 1640<br>1200 |
| Comparative Example 13 | commercial NH$_4$ salt of polyacrylic acid | 1.2<br>1.5 | 1796<br>1870 |

EXAMPLES 16–18

A beaker was charged with 200 g of an aqueous solution having dissolved therein a predetermined amount (see Table 6) of an NH$_4$ salt of one of the copolymers (mol. wt. 4400, 9200 and 28000) of polymerizable components in naphtha oil and maleic anhydride. After adding 300 g of silicon carbide (DU A-2 of Shows Denko K.K.), slurries were prepared as in Example 1. The apparent viscosities of the resulting 60% slurries were measured and the results are shown in Table 6.

COMPARATIVE EXAMPLE 14

Slurries were prepared as in Examples 16–18 except that the NH$_4$ salts of copolymers of polymerizable components in naphtha oil and maleic anhydride which were used as dispersants were replaced by a commercial NH$_4$ salt of polyacrylic acid. The apparent viscosities of the resulting 60% slurries of silicon carbinde were measured and the results are shown in Table 6.

COMPARATIVE EXAMPLE 15

Slurries were prepared as in Examples 16–18 except that the NH$_4$ salts of copolymers of polymerizable components in naphtha oil and maleic anhydride which were used as dispersants were replaced by a commercial NH$_4$ salt of modified isobutylene-maleic anhydride copolymer. The apparent viscosities of the resulting 60% slurries of silicon carbide were measured and the results are shown in Table 6.

EXAMPLES 19–21

A beaker was charged with 200 g of an aqueous solution having dissolved therein a predetermined amount (see Table 7) of an HN$_4$ salt of one of the copolymers (mol. wt. 4400, 9200 and 28000) of polymerizable components in naphtha oil and maleic anhydride. After adding 300 g of iron oxide (particle size, 0.7 μm; specific surface area, 4 m$^2$/g), slurries were prepared as in Example 1. The apparent viscosities of the resulting 60% slurries are shown in Table 7.

COMPARATIVE EXAMPLE 16

Slurries were prepared as in Examples 19–21 except that the NH$_4$ salts of copolymers of polymerizable components in naphtha oil and maleic anhydride which were used as dispersants were replaced by a commercial NH$_4$ salt of polyacrylic acid. The apparent viscosities of the resulting 60% slurries of iron oxide were measured and the results are shown in Table 7.

COMPARATIVE EXAMPLE 17

Slurries were prepared as in Examples 19–21 except that the NH$_4$ salts of copolymers of polymerizable components in naphtha oil and maleic anhydride which were used as dispersants were replaced by a commercial NH$_4$ salt of modified isobutylene-maleic anhydride copolymer. The apparent viscosities of the resulting 60% slurries of iron oxide were measured and the results are shown in Table 7.

TABLE 6

| | Dispersant | Amount of dispersant (% pure content vs silicon carbide) | Viscosity (cps) |
|---|---|---|---|
| Example 16 | NH$_4$ salt of copolymer (mol. wt. 4400) of polymerizable components in naphtha oil and maleic anhydride | 0.2<br>0.3 | 106<br>102 |
| Example 17 | NH$_4$ salt of copolymer (mol. wt. 9200) of polymerizable components in naphtha oil and maleic anhydride | 0.2<br>0.3 | 99<br>96 |
| Example 18 | NH$_4$ salt of copolymer (mol. wt. 28000) of polymerizable components in naphtha oil and maleic anhydride | 0.2<br>0.3 | 109<br>70 |
| Comparative Example 14 | commercial NH$_4$ salt of polyacrylic acid | 0.2<br>0.3 | 710<br>620 |
| Comparative Example 15 | commercial NH$_4$ salt of modified isobutylene/maleic anhydride copolymer | 0.2<br>0.3 | 120<br>110 |

TABLE 7

| | Dispersant | Amount of dispersant (% pure content vs iron oxide) | Viscosity (cps) |
|---|---|---|---|
| Example 19 | NH₄ salt of copolymer (mol. wt. 4400) of polymerizable components in naphtha oil and maleic anhydride | 2.0 | 42 |
| Example 20 | NH₄ salt of copolymer (mol. wt. 9200) of polymerizable components in naphtha oil and maleic anhydride | 2.0 | 48 |
| Example 21 | NH₄ salt of copolymer (mol. wt. 28000) of polymerizable components in naphtha oil and maleic anhydride | 2.0 | 36 |
| Comparative Example 16 | commercial NH₄ salt of polyacrylic acid | 2.0 | 69 |
| Comparative Example 17 | commercial NH₄ salt of modified isobutylene/ maleic anhydride copolymer | 2.0 | 51 |

EXAMPLE 22

Preparation:

A coal tar naphtha fraction containing 50 wt% of polymerizable components such as indene and coumarone (37.3 wt% indene) was reacted with maleic anhydride at a polymerizable component to maleic anhydride molar ratio of 1:1 in the presence of a radical reaction initiator azobisisobutyronitrile (1.00 mol% of maleic anhydride) to form copolymer A (number average mol. wt. 3,200). Copolymer A was neutralized with sodium hydroxide to prepare a sodium salt of copolymer A in aqueous solution.

Testing:

The performance of the admixture thus prepared was evaluated by performing the following tests on a mortar composition whose recipe is shown in Table 8.

TABLE 8

| Water-to-cement ratio (%) | Mortar Recipe Proportions (g) | | |
|---|---|---|---|
| | Cement | water | sand |
| 45.0 | 1000 | 450 | 2000 |

Water, cement and the admixture (0.4 wt% of cement on a solids basis) were put into a cement mixing vessel and mixed for 30 seconds. Sand was added with stirring over a period of 30 seconds, followed by mixing for an additional 60 seconds. After standing for 20 seconds, the mortar adhering to the wall of the container and to the surface of the paddle was scraped off, followed by remixing for 120 seconds.

A portion of the mortar thus prepared was placed into a mini-slump cone 15 cm high and the slump of the mortar as determined after removal of the cone was 12.5 cm.

Another portion of the mortar was placed into a metal cylinder having a height of 9.5 cm and an inside diameter of 8.2 cm and its weight was measured. The air content of the mortar as calculated from its weight was 5.6 %.

Another portion of the mortar was left to stand for 60 minutes and thereafter mixed for another 1 minute. The slump of the mortar as determined by the same method as described above was 12.5 cm. The residual slump (%) as determined by the following formula was 100 %.

$$\text{Residual slump (\%)} = \frac{\text{slump after 60 min}}{\text{initial slump}} \times 100$$

EXAMPLE 23

Copolymer A having a number average molecular weight of 5,200 was prepared as in Example 22. This copolymer was neutralized with sodium hydroxide to form a sodium salt of copolymer A in aqueous solution.

Testing

A mortar was made using the admixture prepared above and subjected to tests as in Example 22. The results are summarized in Table 9.

EXAMPLE 24

Preparation:

Copolymer A having a number average molecular weight of 5,200 was prepared as in Example 22. This copolymer was neutralized with potassium hydroxide to form a potassium salt of copolymer A in aqueous solution.

Testing:

A mortar was made using the admixture prepared above and subjected to tests as in Example 22. The results are summarized in Table 9.

EXAMPLE 25

Preparation:

Copolymer A having a number average molecular weight of 5,200 was prepared as in Example 22. This copolymer was neutralized with ammonia to form an ammonium salt of copolymer A in aqueous solution.

Testing:

A mortar was made using the admixture prepared above and subjected to tests as in Example 22. The results are summarized in Table 9.

EXAMPLE 26

Preparation:

Copolymer A having a number average molecular weight of 9,700 was prepared as in Example 22. This copolymer was neutralized with sodium hydroxide to form a sodium salt of copolymer A in aqueous solution.

Testing:

A mortar was made using the admixture prepared above and subjected to tests as in Example 22. The results are summarized in Table 9.

EXAMPLE 27

Preparation:

Copolymer A having a number average molecular weight of 5,600 was prepared as in Example 22. This copolymer was neutralized with sodium hydroxide to form a sodium salt of copolymer A in aqueous solution (hereunder designated as component A).

To 128.0 g of a naphthalene oil fraction (for its composition, see under I in Table 10) obtained by coal tar distillation, 140.0 g of 98 % sulfuric acid was added and sulfonation of the oil fraction was conducted at 150° C. for 3 hours.

After diluting the sulfonated product with water, 64.9 g of formaldehyde was added and a condensation reaction was performed at 100° C. for 16 hours. Finally, liming sodation was performed to remove the unreacted sulfuric acid as gypsum form the condensation product, thus obtaining a sodium salt in aqueous solution of the condensate of sulfonated aromatic hydrocarbon and formaldehyde (hereunder designated as component B).

Components A and B were mixed at a ratio of 5:5 (on a solid weight basis) to prepare a cement admixture.

Testing:

A mortar was made using the admixture thus prepared and subjected to tests as in Example 22. The results are summarized in Table 9.

EXAMPLE 28

Preparation:

A cement admixture was prepared as in Example 27 except that the naphthalene oil fraction shown under I in Table 10 was replaced with a different grade of naphthalene oil fraction obtained by coal tar distillation (for its composition, see under II in Table 10).

Testing:

A mortar was made using the admixture thus prepared and subjected to tests as in Example 22. The results are summarized in Table 9.

EXAMPLE 29

Preparation:

A cement admixture was prepared as in Example 27 except that the naphthalene oil fraction shown under I in Table 10 was replaced with a methylnaphthalene oil fraction obtained by coal tar distillation (for its composition, see under III in Table 10).

Testing:

A mortar was made using the admixture thus prepared and subjected to tests as in Example 22. The results are summarized in Table 9.

EXAMPLE 30

Preparation:

A cement admixture was prepared as in Example 27 except that the naphthalene oil fraction shown under I in Table 10 was replaced with another grade of methyl naphthalene oil fraction obtained by coal tar distillation (for its composition, see under IV in Table 10).

Testing:

A mortar was made using the admixture thus prepared and subjected to tests as Example 22. The results are summarized in Table 9.

EXAMPLE 31

Preparation:

A cement admixture was prepared as in Example 27 except that the sodium salt of the condensate of sulfonated aromatic hydrocarbon and formaldehyde prepared from the naphthalene oil fraction shown under I in Table 10 was replaced with a commercial sodium salt of naphthalene sulfonate-formaldehyde condensate.

Testing:

A mortar was made using the admixture thus prepared and subjected to tests as in Example 22. The results are summarized in Table 9.

EXAMPLE 32

Preparation:

A cement admixture was prepared as in Example 27 except that the sodium salt of the condensate of sulfonated aromatic hydrocarbon and formaldehyde prepared from the naphthalene oil fraction shown under I in Table 10 was replaced with a commercial sodium salt of naphthalene sulfonate-formaldehyde condensate (designated as component B), and component A and B were mixed at ratio of 3:7 (on a solid weight basis).

Testing:

A mortar was made using the admixture thus prepared and subjected to tests as in Example 22. The results are summarized in Table 9.

EXAMPLE 33

Preparation:

A cement admixture was prepared as in Example 27 except that the sodium salt of the condensate of sulfonated aromatic hydrocarbon and formaldehyde prepared from the naphthalene oil fraction shown under I in Table 10 was replaced with a commercial sodium salt of naphthalene sulfonate-formaldehyde condensate (designated as component B), and component A and B were mixed at ratio of 1:9 (on a solid weight basis).

Testing:

A mortar was made using the admixture thus prepared and subjected to tests as in Example 22. The results are summarized in Table 9.

COMPARATIVE EXAMPLE 18

Using a commercial cement admixture (i.e. a sodium salt of naphthalene sulfonate-formaldehyde condensate), a mortar was made and subjected to tests as in Example 22. The results are shown in Table 9.

COMPARATIVE EXAMPLE 19

A commercial styrene-maleic anhydride copolymer (SMA 1000; number average mol. wt. 1,500) was neutralized with sodium hydroxide to obtain a sodium salt of the copolymer. A mortar was made using this admixture and subjected to tests as in Example 22. The results are shown in Table 9.

COMPARATIVE EXAMPLE 20

A commercial styrene-maleic anhydride copolymer (SMA 1000; number average mol. wt. 1,500) was neutralized with sodium hydroxide to obtain a sodium salt of the copolymer. This copolymer salt was mixed with a commercial sodium salt of naphthalene sulfonate-formaldehyde condensate at a ratio of 5:5 (on a solids weight basis) to prepare a cement admixture. A mortar was made using this admixture and subjected to tests as in Example 22. The results are shown in Table 9.

COMPARATIVE EXAMPLE 21

A mortar was made as in Example 22 except that no admixture was used. The results of tests conducted on this mortar as in Example 22 are shown in Table 9.

INDUSTRIAL APPLICABILITY

The use of the dispersant of the present invention contributes to marked improvement in the viscosity of dispersions of inorganic or organic fine powders. In addition, the dispersions containing this dispersant have excellent aging stability. Hence, the dispersant of the present invention can be used with advantage in a broad range of applications including paints, inks, paper processing, pigment manufacture, civil engineering, ceramics, ferrites, fuels, etc.

The novel cement admixture of the present invention, when incorporated in cement mixes, imparts high initial flowability to the mixes and ensures that their flowability will not decrease greatly over time. Therefore, this admixture is useful as an additive to be incorporated in fresh concretes and other cement mixes.

The dispersant of the present invention has the added advantage of high heat resistance and hence may be used effectively as a mud stabilizer in civil engineering.

TABLE 9
(Results of Mortar Tests)

| | Admixture | Initial values slump (cm) | Initial values air content (%) | Slump after 60 min (cm) | Residual slump (%) | Salt of copolymer content (%) |
|---|---|---|---|---|---|---|
| Example 22 | Na salt of copolymer A (mol. wt. 3,200) | 12.5 | 5.6 | 12.5 | 100.0 | 100 |
| Example 23 | Na salt of copolymer A (mol. wt. 5,200) | 12.4 | 3.9 | 12.3 | 99.2 | 100 |
| Example 24 | K salt of copolymer A (mol. wt. 5,200) | 12.4 | 3.8 | 12.2 | 98.4 | 100 |
| Example 25 | NH$_4$ salt of copolymer A (mol. wt. 5,200) | 12.5 | 4.1 | 12.3 | 98.4 | 100 |
| Example 26 | Na salt of copolymer A (mol. wt. 9,700) | 12.4 | 1.8 | 11.9 | 96.0 | 100 |
| Example 27 | Na salt of naphthalene oil (mol. wt. 5,600) + Na salt of naphthalene oil fraction I | 12.5 | 1.7 | 11.4 | 91.2 | 50 |
| Example 28 | Na salt of copolymer A (mol. wt. 5,600) + Na salt of naphthalene oil fraction II | 12.5 | 2.0 | 11.4 | 91.2 | 50 |
| Example 29 | Na salt of copolymer A (mol. wt. 5,600) + Na salt of naphthalene oil fraction III | 12.7 | 2.0 | 11.5 | 90.6 | 50 |
| Example 30 | Na salt of copolymer A (mol. wt. 5,600) + Na salt of naphthalene oil fraction IV | 12.4 | 1.9 | 11.3 | 91.1 | 50 |
| Example 31 | Na salt of copolymer A (mol. wt. 5,600) + commercial Na salt of naphthalene sulfonate | 12.6 | 1.5 | 11.6 | 92.1 | 50 |
| Example 32 | Na salt of copolymer A (mol. wt. 5,600) + commercial Na salt of naphthalene sulfonate | 12.4 | 2.2 | 10.9 | 87.9 | 70 |
| Example 33 | Na salt of copolymer A (mol. wt. 5,600) + commercial Na salt of naphthalene sulfonate | 12.3 | 2.8 | 8.9 | 72.3 | 10 |
| Comparative Example 18 | commercial Na salt of naphthalenesulfonate | 11.9 | 3.1 | 6.4 | 53.8 | 0 |
| Comparative Example 19 | commercial Na salt of sytrene-maleic anhydride copolymer (SMA 1000; mol: mol. wt. 1,500) | 10.0 | 13.0 | 10.0 | 100.0 | — |
| Comparative Example 20 | commercial Na salt of styrene-maleic anhydride copolymer (SMA 1000; mol wt. 1,500) + commercial Na salt of naphthalenesulfonate | 11.8 | 2.4 | 9.7 | 82.2 | — |
| Comparative Example 21 | not added | 8.4 | 3.8 | 4.9 | 58.3 | — |

TABLE 10
(Naphthalene oil fraction and methylnaphthalene oil fraction)

| Composition (wt %) | I | II | III | IV |
|---|---|---|---|---|
| Indene | 6.7 | 6.8 | — | — |
| Naphthalene | 9.1 | 49.9 | 6.9 | — |
| β-Methylnaphthalene | 9.1 | 9.2 | 39.8 | 9.3 |
| α-Methylnaphthalene | 3.5 | 3.6 | 15.7 | 21.8 |
| Quinoline | 1.6 | — | — | — |
| Diphenyl | 1.8 | 1.8 | 5.9 | 10.4 |
| Acenaphthene | 4.0 | 4.1 | 7.1 | 14.2 |
| Fluorene | 4.1 | 4.2 | 2.4 | 4.7 |
| Dimethylnaphthalene | 2.6 | 2.6 | 10.2 | 17.7 |
| Others | 17.5 | 17.8 | 12.0 | 21.9 |

When the dispersant is used as a cement admixture, it is particularly effective in reducing slump loss.

Compared to the case where a styrene-maleic anhydride copolymer is used as an admixture, the admixture of the present invention attains greater improvement in flowability when it is incorporated in cement mixes. A further advantage of this admixture is that it can be produced at low cost since indene-containing oil fractions (e.g. coal tar heavy gas oil such as CN oil, coke oven gas oil such as $C_9^+$oil, and petroleum-derived $C_9^+$fraction) which are inexpensive coal or petroleum-derived by-product oils can be used as starting materials without being separated or purified by any special method.

We claim:

1. A dispersant composed of a water-soluble salt of a copolymer produced by polymerizing a naphtha oil and maleic anhydride, said naphtha oil containing at least 5 wt % of polymerizable double bond components consisting essentially of
   (a) 70–99 wt % by weight of indene;
   (b) 0.5–29.5 wt % by weight of styrene; and
   (c) 0.5–29.5 wt % by weight in total of one or more compounds selected from the group consisting of α-methylstyrene, methylstyrene, methylindene, dimethylstyrene, trimethylstyrene, coumarone and dicyclopentadiene,
   wherein the sum of (a), (b) and (c) is substantially 100 wt %.

2. A dispersant according to claim 1 wherein said water-soluble salt is an alkali metal salt or an ammonium salt.

3. A dispersant composed of a water-soluble salt of a partial esterification product of a copolymer produced by polymerizing a naphtha oil and maleic anhydride, said naphtha oil consisting essentially of
   (a) 70–99 wt % by weight of indene;
   (b) 0.5–29.5 wt % by weight of styrene; and
   (c) 0.5–29.5 wt % by weight in total of one or more compounds selected from the group consisting of α-methylstyrene, methylstyrene, methylindene, dimethylstyrene, trimethylstyrene, coumarone and dicyclopentadiene,
   wherein the sum of (a), (b) and (c) is substantially 100 wt %.

4. A dispersant according to claim 1 wherein said water-soluble salt is an alkali metal salt or an ammonium salt.

5. A cement admixture which comprises at least one component selected from the group consisting of alkali metal salts, ammonium salts and amine salts of a copolymer produced by polymerizing a naphtha oil and an unsaturated dicarboxylic acid anhydride, said naphtha oil consisting essentially of
   (a) 70–99 wt % by weight of indene;
   (b) 0.5–29.5 wt % by weight of styrene; and
   (c) 0.5–29.5 wt % by weight in total of one or more compounds selected from the group consisting of α-methylstyrene, methylstyrene, methylindene, dimethylstyrene, trimethylstyrene, coumarone and dicyclopentadiene,
   wherein the sum of (a), (b) and (c) is substantially 100 wt %.

6. A cement admixture according to claim 5, further comprising at least one additional component selected from the group consisting of alkali metal salts, alkaline earth metal salts, ammonium salt and amine salts of a compound prepared by first sulfonating a naphthalene and/or alkylnaphthalene based aromatic hydrocarbon containing oil, then condensing the sulfonated product with formaldehyde.

7. A cement admixture according to claim 6 which contains at least 10 parts by weight of said copolymer salt as the first component whereas said additional component is contained in an amount of 90 parts by weight.

8. A dispersant of claim 1 wherein the naphtha oil contains 5 to 80% by weight of said polymerizable double bond components.

9. A dispersant of claim 3 wherein the naphtha oil contains 5 to 80% by weight of said polymerizable double bond components.

10. A cement admixture of claim 5 wherein the naphtha oil contains 5 to 80% by weight of said polymerizable double bond components.

* * * * *

UNITED STATES PATENT AND TRADEMARK OFFICE
CERTIFICATE OF CORRECTION

PATENT NO. : 5,179,170
DATED : January 12, 1993
INVENTOR(S) : K. OHTSU et al It is certified that error appears in the above-identified patent and that said Letters Patent is hereby corrected as shown below:

Column 25, lines 21, 22, 23, 37, 38 and 39 and

Column 26, lines 14, 15, and 16, cancel "wt"

Column 26, line 5, change "1" to --3--

Column 25, line 35 and

Column 26, line 11, after "oil", insert --containing at
   least 5 wt % of polymerizable double bond components.--

Signed and Sealed this

Twenty-second Day of March, 1994

Attest:

BRUCE LEHMAN

*Attesting Officer*   *Commissioner of Patents and Trademarks*